United States Patent
Miskech et al.

(10) Patent No.: US 6,742,832 B1
(45) Date of Patent: Jun. 1, 2004

(54) VEHICLE BED ASSEMBLY AND A METHOD FOR MAKING A VEHICLE BED ASSEMBLY

(75) Inventors: Peter Miskech, Dearborn, MI (US); David Gary Dahlstrom, Grosse Pointe Farms, MI (US); Keith Alan Kuzmich, Commerce Township, MI (US); Earl Ray Dover, St. Clair Shoes, MI (US); Karen Diane Wallag, Dearborn, MI (US); James Matthew Posa, Grosse Ile, MI (US); Joseph Paul Tekelly, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,936

(22) Filed: Aug. 30, 2002

(51) Int. Cl.[7] .............................................. B62D 27/00
(52) U.S. Cl. ............................... 296/183.1; 216/186.1; 216/36
(58) Field of Search ................... 296/181.1, 182.1, 296/183.1, 184.1, 186.1, 180, 32, 36, 29

(56) References Cited

U.S. PATENT DOCUMENTS

| | | | | |
|---|---|---|---|---|
| 81,800 A | * | 9/1868 | Lewis | |
| 117,637 A | * | 8/1871 | Jensen | |
| 121,409 A | * | 11/1871 | Pettit | |
| 225,052 A | * | 3/1880 | Gorham | |
| 276,821 A | * | 5/1883 | Hull | |
| 318,703 A | * | 5/1885 | Dick | |
| 1,046,305 A | * | 12/1912 | Keagy et al. | |
| 3,842,755 A | * | 10/1974 | Carr | |
| 4,188,058 A | | 2/1980 | Resa et al. | |
| 4,333,678 A | * | 6/1982 | Munoz et al. | |
| 4,671,562 A | * | 6/1987 | Broadbent | 296/183 |
| 4,768,822 A | * | 9/1988 | Gower | |
| 4,815,787 A | * | 3/1989 | Hale | 296/43 |
| 4,984,673 A | | 1/1991 | Saito et al. | |
| 4,991,899 A | * | 2/1991 | Scott | 296/39.2 |
| 5,419,602 A | * | 5/1995 | VanHoose | 296/39.1 |
| 5,562,321 A | * | 10/1996 | VanHoose | 296/39.1 |
| 5,575,525 A | | 11/1996 | Walworth et al. | |
| 5,664,451 A | | 9/1997 | Schultz | |
| 5,704,678 A | * | 1/1998 | Elwell et al. | 296/39.2 |
| 5,730,486 A | | 3/1998 | Jurica | |

(List continued on next page.)

FOREIGN PATENT DOCUMENTS

| | | | | |
|---|---|---|---|---|
| GB | 2118109 | * | 10/1983 | 296/39.1 |
| GB | 2257666 | * | 1/1993 | 296/39.2 |
| JP | 53-20225 | * | 2/1978 | |
| JP | 62-12478 | * | 1/1987 | 296/39.2 |
| WO | WO 01/66301 A1 | | 9/2001 | |

*Primary Examiner*—D. Glenn Dayoan
*Assistant Examiner*—H. Gutman
(74) *Attorney, Agent, or Firm*—Raymond L. Coppiellie

(57) ABSTRACT

A vehicle bed assembly 10 has a floor pan 18, a front wall 20, and substantially identical side walls 14, 16. The front wall 20 and the side walls 14, 16 are coupled to the floor pan 18. The vehicle bed assembly 10 further includes a rear wall 22 which is deployed upon a tailgate 21 which is selectively coupled to the floor pan 18, and a pair of substantially identical top rail members 100 which overlay and receive a unique one of the side walls 14, 16 and a bracket 210 which overlays and receives the front wall 20 and which is coupled to the top rail member 100 by a pair of end cap members 122. Particularly, the end cap members 122 and the top rail members 100 cooperatively provide a direct load path from any location on each of the side walls 14, 16 to the bracket 210 which may be coupled to a portion of the vehicle 12, thereby reducing the likelihood of damage to the sidewalls 14, 16 and the front wall 20. The assembly 10 may further include reception members 38, 40, 42, 44 which allow a raised platform to be constructed or placed within the vehicle bed assembly 10, and stake pockets 26, 28, 30 and 32.

18 Claims, 4 Drawing Sheets

U.S. PATENT DOCUMENTS

| | | | |
|---|---|---|---|
| 5,823,601 A | * 10/1998 | Stanesic et al. | 296/43 |
| 5,927,788 A | * 7/1999 | Long | 296/39.2 |
| 5,938,272 A | 8/1999 | Jurica et al. | |
| 6,128,815 A | 10/2000 | Jurica et al. | |
| 6,142,549 A | 11/2000 | Clare et al. | |
| 6,170,905 B1 | 1/2001 | Jurica | |
| 6,286,884 B1 | * 9/2001 | Speece | 296/39.2 |
| 6,308,411 B1 | 10/2001 | Wright, Jr. et al. | |
| 6,367,867 B1 | * 4/2002 | Kolarik et al. | 296/183 |
| 6,439,649 B1 | * 8/2002 | Lorenzo et al. | 296/183 |
| 2002/0149223 A1 | * 10/2002 | Saucier et al. | 296/39.2 |

* cited by examiner

US 6,742,832 B1

VEHICLE BED ASSEMBLY AND A METHOD FOR MAKING A VEHICLE BED ASSEMBLY

BACKGROUND OF INVENTION

1. Field of the Invention

The present invention generally relates to a vehicle bed assembly and to a method for making or constructing a vehicle bed assembly and more particularly, to a relatively strong vehicle bed assembly which is resistant to damage or breakage and which selectively receives items in an efficient and secure manner.

2. Background of the Invention

A vehicular bed assembly typically includes a floor bed or pan, a pair of side walls which respectively and typically include a wheel well housing, a front panel or wall, and a rear wall or panel which is typically formed upon a selectively movable tailgate which is movably mounted to the floor bed. Particularly, these members when operatively and selectively placed upon a vehicle, such as a truck, cooperatively define and provide a storage environment or "storage space" within which various items may be securely placed.

While the foregoing conventional vehicle bed assembly does provide such a desired storage space, it does have some disadvantages. By way of example and without limitation, a conventional vehicle bed assembly typically is "broken" or becomes damaged at the joint or the "seam" which is respectively formed between each of the side walls and the front wall due to the force (e.g., a shear type force) which acts upon these seams or joints as the vehicle is maneuvered, especially as the vehicle travels at a high rate of speed over a "rough" surface or road.

Further, the foregoing conventional vehicle bed assembly does not easily allow items to be securely placed within the formed bed and does not allow a raised platform to be created and deployed within the formed bed assembly in a manner which allows for various levels of storage to be formed (i.e., a first storage level being defined as the surface of the provided bed and a second level being defined as the surface provided by a platform which is selectively elevated from the bed) and which thereby increases the amount of storage space provided by the formed vehicular bed.

The present invention overcomes these and other disadvantages of the present invention in a new and novel manner.

SUMMARY OF INVENTION

It is a first non-limiting advantage of the present invention to provide a vehicle bed assembly which overcomes some or all of the previously delineated disadvantages of prior vehicle bed assemblies.

It is a second non-limiting advantage of the present invention to provide a method for making a vehicle bed assembly which produces a vehicle bed assembly which overcomes some or all of the previously delineated disadvantages of prior vehicle bed assemblies.

It is a third non-limiting advantage of the present invention to provide a vehicle bed assembly. Particularly, the provided vehicle bed assembly includes a front panel; a first side panel; a second side panel; a floor panel which is coupled to the first and to the second side panel and which is further coupled to the front panel; a first rail which receivably overlays and which is linearly coextensive to a first of the side panels, the first rail coupling the first side panel to the front panel; and a second rail which is substantially identical to the first rail and which receivably overlays and which is linearly coextensive to the second of the side panels, the second rail coupling the second side panel to the front panel.

It is a fourth non-limiting advantage of the present invention to provide a vehicle bed assembly. Particularly, the provided vehicle bed assembly includes a first bracket having a first wall and a second wall which cooperatively form a mounting portion and the first bracket further having a third wall which orthogonally projects from the mounting portion and which is selectively coupled to a vehicular frame member; a floor bed panel which is disposed upon and is coupled to the second wall of the mounting portion; a front panel member which receives a portion of the floor bed panel and which is coupled to the first wall of the first bracket; a second bracket which receives the front panel member; a first side panel which is coupled to the floor bed panel; a second side panel which is coupled to the floor bed panel; a first rail which receives the first side panel; a second rail which receives the second side panel; a first end cap member which is disposed within the first rail and which selectively couples the first rail to the second bracket; and a second end cap member which is substantially identical to the first end cap member, which is disposed within the second rail, and which selectively couples the second rail to the second bracket.

It is a fifth non-limiting advantage of the present invention to provide a method for making a vehicular bed assembly for use on a vehicle. Particularly, the method includes the steps of providing a floor pan; providing a front panel; providing a first side panel; providing a second side panel; providing a tail gate; coupling the front panel to the floor panel; coupling the first side panel to the floor panel; coupling the second side panel to the floor panel; coupling the tail gate to the floor panel; providing a direct load path from any location on the first side panel to a portion of a vehicle; and providing a direct load path from any location on the second side panel to the portion of the vehicle, thereby forming a vehicle bed assembly.

These and other features and advantages of the present invention will become apparent from a reading of the following detailed description of the preferred embodiment of the invention and by reference to the following drawings

DETAILED DESCRIPTION

Figure 1:
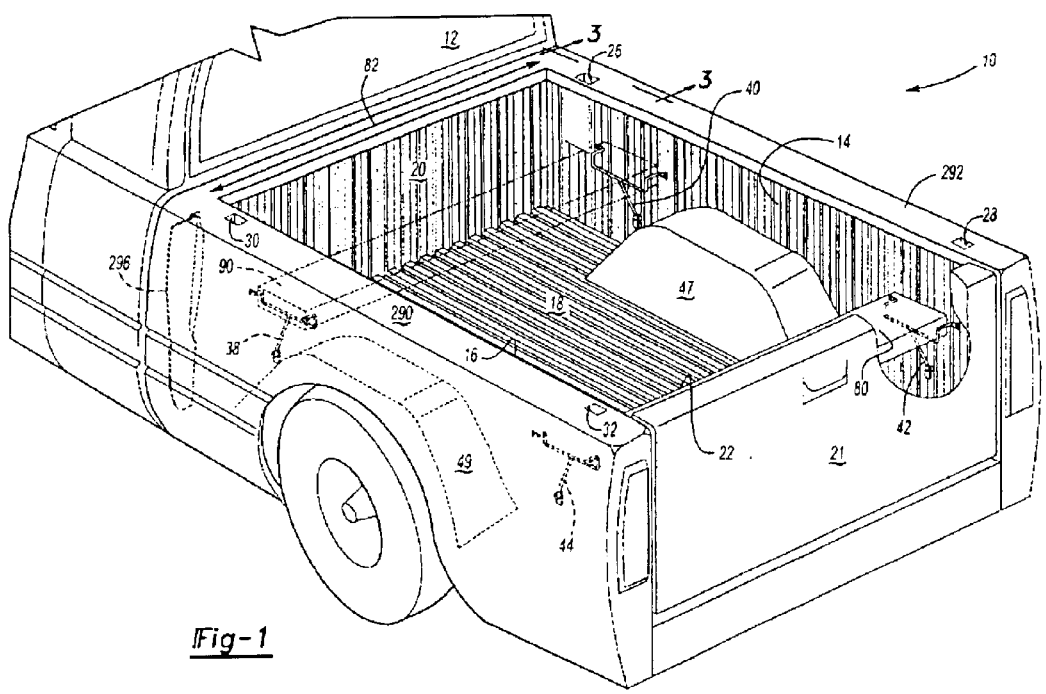
FIG. 1 is a perspective and partial cut-away view of a vehicle bed assembly which is made in accordance with the teachings of the preferred embodiment of the invention and which is shown in assembled relation with a vehicle.

Referring now to FIG. 1, there is shown a vehicular bed assembly 10 which is made in accordance with the teachings of the preferred embodiment of the invention in assembled relation with a vehicle, such as but not limited to a truck 12. It should be appreciated that the vehicle 12 may be a conventional and commercially available vehicle or truck and the vehicle or the truck 12 may be of substantially any desired design or configuration. Hence, nothing in this description should be construed or is meant to be construed as limiting the present invention to a particular type of vehicle or truck or to a particular truck or vehicular configuration. Rather, the present invention is applicable to a wide variety of diverse truck and vehicular configurations. It should further be appreciated that the vehicle bed assembly 10 may be selectively attached, in a retrofit manner, to an existing vehicle or truck or placed upon a vehicle or truck as part of an overall vehicular or truck production process.

Figure 2:
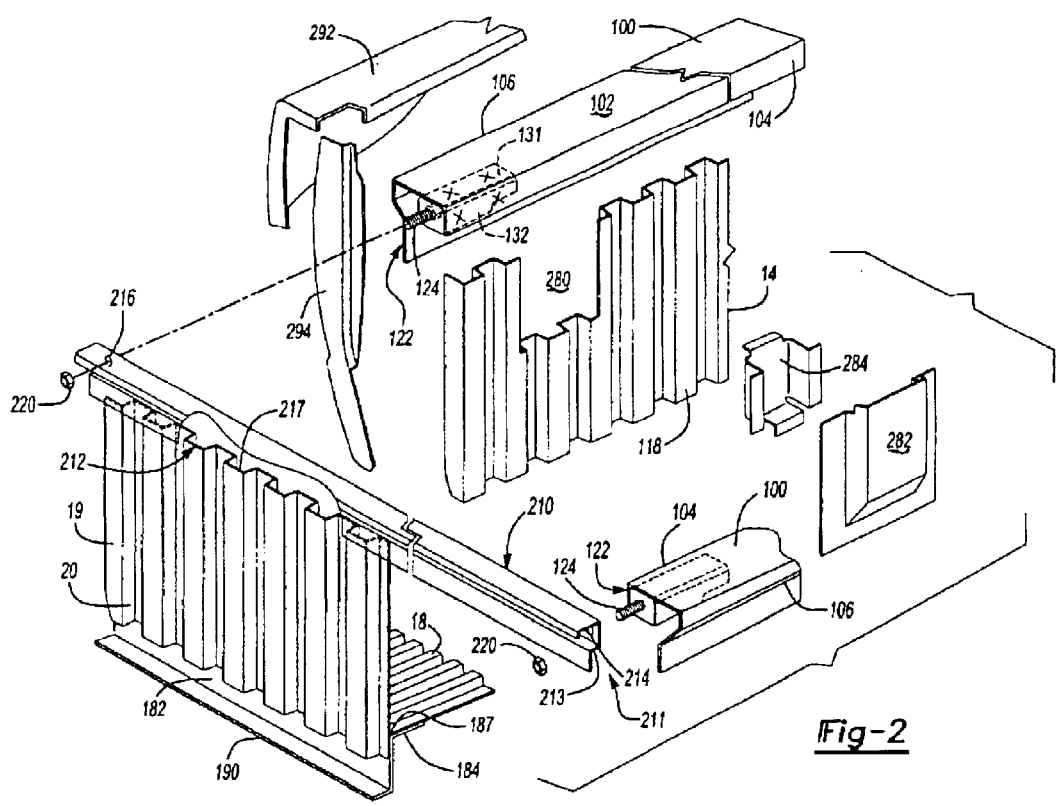
FIG. 2 is a perspective unassembled view of a portion of the vehicle bed assembly which is generally shown in FIG. 1.
Figure 3:
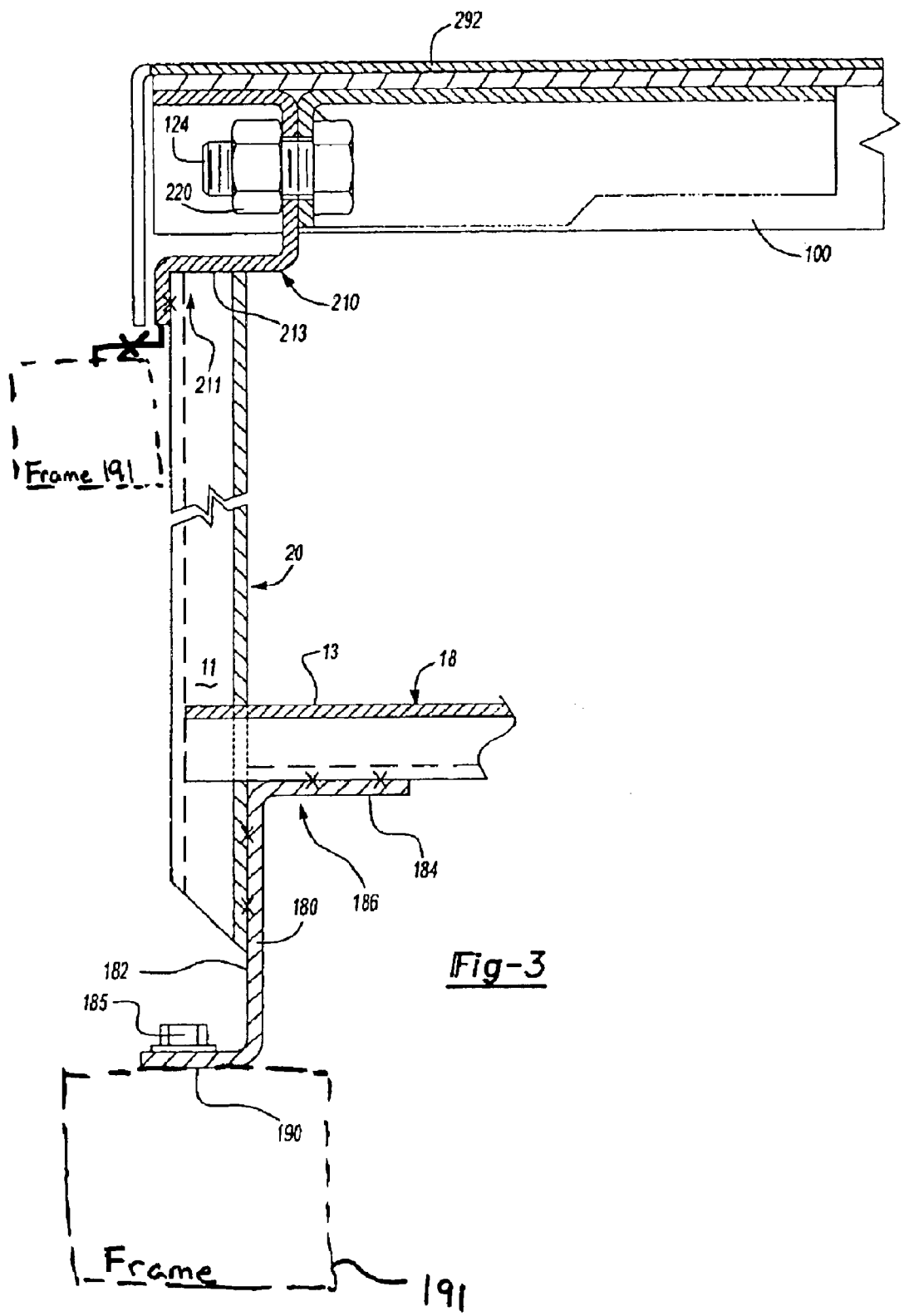
FIG. 3 is a side sectional view of a portion of the vehicle bed assembly which is generally shown in FIG. 1 and 2 and which is taken along view line 3—3.

Particularly, the vehicular bed assembly 10 includes a pair of corrugated and substantially identical side walls 14, 16 and a corrugated floor pan or floor bed 18 which is coupled to the pair of substantially identical side walls 14, 16. Further, the vehicle bed assembly 10 includes a corrugated front wall 20 which is coupled to the pair of substantially identical side walls 14, 16 and to the floor pan 18. It should be appreciated that the front wall 20 and the side walls 14, 16 may each be respectively coupled to the floor pan 18 by the use of a welded connection or by any other desired technique or methodology which selectively forms a seam or a joint between the side wall 14 and the floor pan 18, between the side wall 16 and the floor pan 18, and between the front wall 20 and the floor pan 18. It should further be appreciated that the corrugated shape of the front wall 20 and the floor pan 18 permits the front wall 20 and the floor pan 18 to be aligned orthogonally and to selectively interlock prior to coupling (e.g., by welding), to ensure a rigid connection between the floor pan 18 and the front wall 20. That is, as best shown in FIGS. 2 and 3, each raised "bead" 13 of the floor pan 18 resides and is nestled within a unique one of the channels 11 (i.e., the gaps between raised beads 19) of the front wall 20. Moreover, the side walls 14, 16 may each be respectively coupled to the front wall 20 by any conventional or desired joint or seam forming methodology or, in the preferred embodiment of the invention, by a respective attachment assembly which is described in greater detail below. As further shown, the vehicle bed assembly 10 includes a tailgate 21 which is selectively and movably attached to the floor pan 18 by the use of hinges (not shown) or by the use of other conventional and commercially available devices. A corrugated rear wall 22 may be deployed upon the selectively movable tailgate 21. Further, the vehicle bed assembly 10 includes substantially identical stake pockets 26, 28, 30, and 32 which may selectively receive a stake (not shown) in order to facilitate the desired reception or storage of various assemblies (e.g., the stakes may cooperatively allow a canopy to protectively overlay items which may be selectively placed within the vehicle bed assembly 10). Further, the vehicle bed assembly 10 includes four substantially identical reception members 38, 40, 42, and 44 which are more fully explained below and a pair of conventional wheel wells 47, 49 which are respectively coupled to the side walls 14, 16 and to the floor pan 18 by a traditional or desired connection or attachment methodology (e.g., by the use of a welded connection). It should be appreciated that in other non-limiting embodiments, side walls 14, 16, front wall 20, rear wall 22, and floor pan 18 are not corrugated but may be substantially planar or have any other type of desired geometric configuration or shape.

Figure 4:
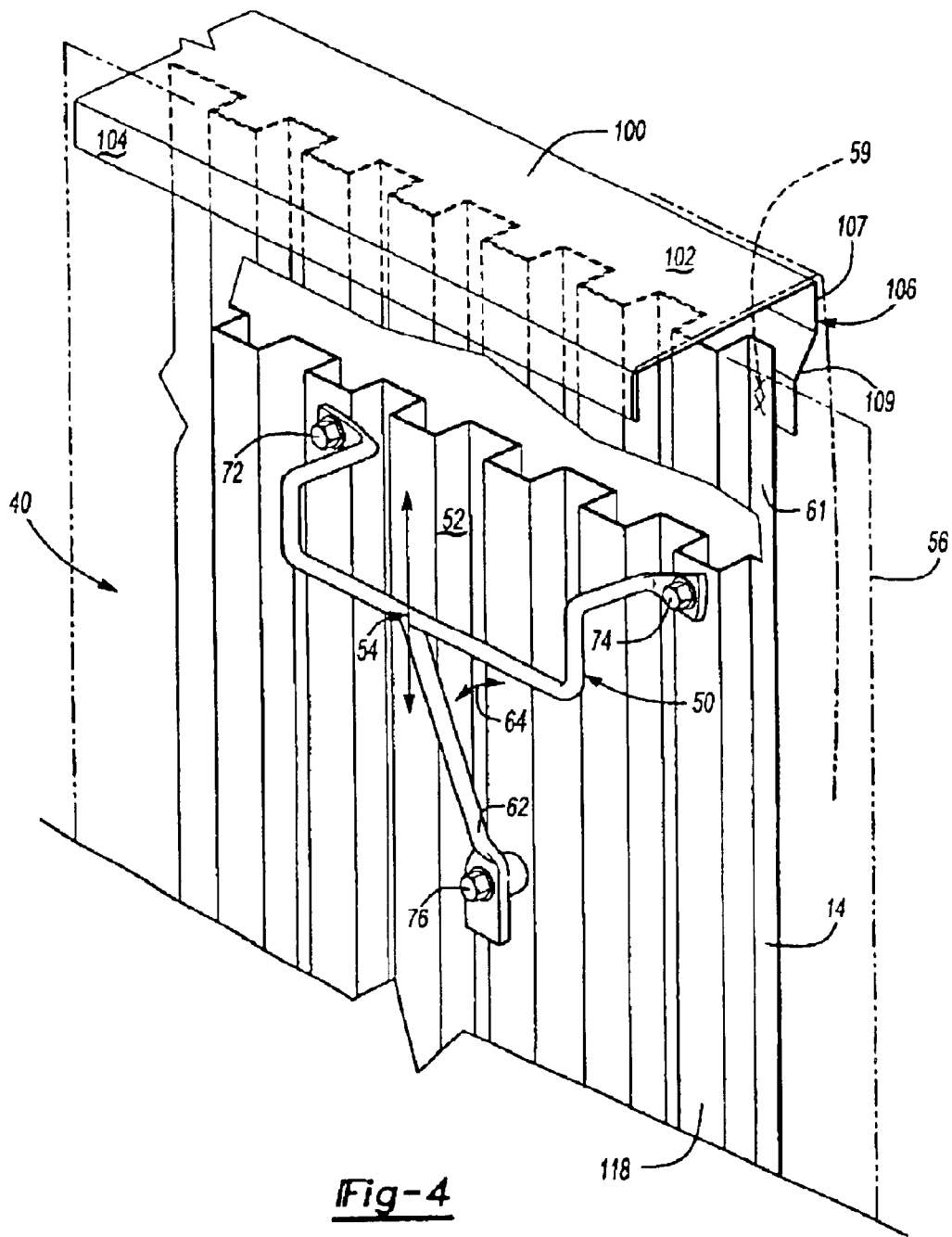
FIG. 4 is perspective and partial cut-away view of a portion of the side panel which is generally shown in FIG. 1.

To further understand the principles of the present invention, reference is now additionally made to FIGS. 2–4. Particularly, as best shown in FIG. 4, each of the substantially identical reception members 38–44 includes a first portion 50 which forms a reception pocket 52. Particularly, each portion 50 has an axis of symmetry 54 which is substantially parallel to the plane 56 which contains each of the raised beads 118 of one of the corrugated side walls 14, 16. Each member 38–44 also has a second stem portion 62 which forms an acute angle 64 with the respective first portion 50 and with the axis of symmetry 54. The portions 50 and 62 of each of the members 38–44 are coupled to a unique one of the side walls 14, 16 and when the second stem portion 62 of a member 38 44 is selectively coupled to one of the side walls 14, 16, the pocket portion 52 of that member 38–44 projects away from the one side wall 14, 16. As best shown in FIG. 1, reception members 38, 44 are operatively placed on the side wall 16 while reception members 40, 42 are operatively placed upon the side wall 14 by the use of respective bolts 72, 74, 76 (or other securing mechanisms or devices). It should be appreciated that the respective bolts 72, 74, 76 of the member 38 are respectively aligned with the respective bolts 72, 74, 76 of the member 40, thereby causing reception members 38, 40 to be substantially aligned. Further, the respective bolts 72, 74, and 76 of the member 44 are aligned with the respective bolts 72, 74, 76 of the member 42, thereby causing reception members 42 and 44 to be aligned. In this manner, the aligned members 42, 44 cooperatively allow a member, such as member 80, to be securely positioned across the width 82 of the formed vehicular bed assembly 10 and members 38, 40 cooperatively allow a member, such as member 90, to be securely positioned across the width 82 of the vehicular bed 10. That is, in one non-limiting embodiment, a generally planar member 80 may be supportively received within the respective reception pocket portions 52 of the members 42, 44 and a generally planar member 90 may be received within the respective reception pocket portions 52 of the members 38, 40. In this non-limiting embodiment, a single and generally flat sheet of material (not shown), such as but not limited to a sheet of plywood, may be placed upon these deployed members 80, 90, thereby forming a raised storage platform. In one non-limiting embodiment, this sheet or generally flat member (not shown) may be secured to these deployed members 80, 90. In this manner, a second or lower storage bed or platform is formed between the platform and the exposed or top surface of the floor pan 18 of the vehicular bed assembly 10. In the preferred embodiment of the invention members 38, 40 are positioned between front wall 20 and the pair of wheel wells 47, 49 while members 42, 44 are positioned between the tailgate 21 and the pair of wheel wells 47, 49, thereby allowing the sheet of material (not shown) to securely overlay substantially the entire floor pan 18. Different amounts of members 38–44 may be employed in other non-limiting embodiments.

As best shown in FIGS. 2 and 3, the vehicular bed assembly 10 further includes a generally "Z" shaped member 180 having a first wall 182 and a second wall 184 which cooperatively form the floor pan 18 and a mounting portion 186 for the front wall 20 which is selectively attached to the corrugated floor pan 18 and the front wall 20. Particularly, the floor pan 18 is disposed on top of the second wall 184 and the second wall 184 is linearly co-extensive to the edge 187 of the floor plan 18. Specifically, such attachment may be made by use of a welded type connection or by substantially any other desired connection methodology. Further, the wall 182 is selectively coupled to the front wall 20 and such connection may be made by the use of a welded connection or by substantially any other desired connection technique or methodology. Further, the member 180 includes a third wall 190 which orthogonally projects from the wall 182 in the opposite direction of wall 184 and is selectively attached to a vehicular frame member 191 by the use of bolts 185 or other devices or mechanisms, effective to couple the front wall 20 and the floor pan 18 to a vehicle in a secure manner. Importantly, member 180 securely couples front wall 20 to a vehicle's frame (not shown) while permitting the corrugated front wall 20 and floor pan 18 to interlock in the manner discussed above and "rigidize" the vehicular bed 10 assembly (i.e., providing a rigid vehicle bed assembly 10).

Further, as best shown in FIG. 2, each of the top rail members 100 include a substantially identical end cap member or assembly 122 which, in the preferred although non-limiting embodiment of the invention, comprises a generally elongated member having a generally "C" shaped cross sectional area and includes a protruding attachment member 124 which, in one non-limiting embodiment comprises a threaded bolt, although another type of attachment member may be utilized. Particularly, in one non-limiting embodiment, top surface 131 of a first one of the end cap members 122 is attached to the underside of the top surface 102 of the top rail member 100 which receives side wall 14 and inside surface 132 of the first end cap member 122 is attached to the inner side surface of lip 104 of the top rail member 100 which receives side wall 14. Further, top surface 131 of a second one of the end cap members 122 is attached to the underside of the top surface 102 of the rail 100 which receives side wall 16 and the inside surface 132 of the second end cap member 122 is attached to the inner side surface of the lip 104 of the top rail member 100 which receives side wall 16. Such attachment may be made by the use of a welded connection, although other types of connection methodologies may be used. In the most preferred embodiment of the invention, the member 124 of each end cap member 122 extends from or protrudes from a respectively unique one of the rails 100.

As best shown in FIGS. 2 and 3, the vehicular bed assembly 10 further includes a generally "Z" shaped member 180 having a first wall 182 and a second wall 184 which cooperatively form a floor pan 18 and front wall 20 mounting portion 186 which is selectively attached to the corrugated floor pan 18 and the front wall 20. Particularly, the floor pan 18 is disposed on top of the second wall 184 and the second wall 184 is linearly co-extensive to the edge 187 of the floor plan 18. Specifically, such attachment may be made by use of a welded type connection or by substantially any other desired connection methodology. Further, the wall 182 is selectively coupled to the front wall 20 and such connection may be made by the use of a welded connection or by substantially any other desired connection technique or methodology. Further, the member 180 includes a third wall 190 which orthogonally projects from the wall 182 in the opposite direction of wall 184 and is selectively attached to a vehicular frame member (not shown) by the use of bolts 185 or other devices or mechanisms, effective to couple the front wall 20 and the floor pan 18 to a vehicle in a secure manner. Importantly, member 180 securely couples front wall 20 to a vehicle's frame (not shown) while permitting the corrugated front wall 20 and floor pan 18 to interlock in the manner discussed above and "rigidize" the vehicular bed 10 (i.e., providing a rigid vehicle bed 10).

As shown best in FIGS. 2 and 3, the vehicle bed assembly 10 further includes a top rail bracket or member 210 which comprises a generally elongated and generally hollow member having a general "C" shaped cross sectional area and which has an elbow or trough 211 which receives the exposed top portion 212 of the front wall 20 and which includes an undersurface 213 which is attached, by the use of a welded connection or another connection methodology, to the top edges 217 of the beads 19 of the front wall 20. The bracket 210 further includes a pair of opposed and substantially identical apertures 214, 216, each of which selectively receives a unique one of the threaded bolts 124 of end cap members 122. A nut 220 is selectively attached to each of the threaded bolts 124 which protrude trough an opening 214, 216, thereby securing the top rails 100 to the member 210. The member 210 may be selectively attached to a frame portion 191 of the vehicle 12. In this manner, each end cap member 122 selectively attaches a unique one of the rails 100 to the top rail bracket 210 and selectively attaches a unique one of the side walls 14, 16 to the front wall 20 (e.g., in a non-limiting embodiment, the top rails 100 may be directly coupled to the front wall 20).

In the preferred, although non-limiting embodiment of the invention, a pair of aperture or cutaway portions 280 are formed in each of the side walls 14, 16 and are respectively used to form a unique one of the stake pockets 26, 28, 30, and 32. Particularly, each aperture or cutaway portion 280 is respectively overlaid by a first plate member 282 which substantially covers the cutaway portion 280 and a second member 284 which is selectively coupled to the plate member 282 and which cooperates with the plate 282 to form a cavity. Each cavity is respectively extended through the respective top rail member 100 which overlays the side wall 14, 16 which was respectively used to form the cavity. In the foregoing manner, the stake pockets 26, 28, 30, 32 are formed.

The vehicle bed assembly 10 further includes a pair of first trim members 290, 292 which respectively overlay side walls 16, 14, and are attached to a unique one of the top rails 100. Each of the first trim members 292, 290 have openings which allow the respective pairs of stake pockets 26, 28; and 30, 32 to be respectively extended through these members 292, 290 and a pair of second trim members 294, 296 which are respectively attached to members 292, 290 and which respectively cover the opening between end cap member 122 and the outer surface portion 106 of the top rail 100 which overlays the side wall 14 and the opening between end cap member 122 and the outer surface portion 106 of the top rail 100 which overlays the side wall 16.

It should be appreciated that each of the substantially identical top rail members 100 together with their respectively contained end cap member 122 form a top rail assembly which provides a direct load path from any point on a unique one of the side walls 14, 16 to the top rail bracket 210 which is secured to a portion of the frame (not shown) of the vehicle 12 (and/or provides a direct path to the front wall 20). In this manner, the likelihood of structural damage to the side walls 14, 16 or to the location at which these side walls 14, 16 are physically and respectively attached to the front wall 20 (if any) is substantially reduced. That is, the end cap members 122 provide a "living hinge" by allowing for flexibility or movement of the side walls 14, 16 as the vehicle 12 is being maneuvered, especially as the vehicle is being driven over a "rough road" or surface, thereby dissipating the force before it is applied to the front wall 20 (or to the bracket 210). The use of the bracket 210 allows the received force or load to be substantially absorbed by the vehicle 12 before it is communicated to the front wall 20. That is, the protruding members 124 flex and move within apertures 214, 216, thereby dissipating the force which is communicated to these members 124, by the side walls 14, 16, thereby reducing the likelihood of structural damage to the side walls 14, 16, and the front wall 20. Further, the protruding attachment members 124 provide a convenient and efficient way to attach the top rails 100 to the bracket 210.

It is understood that the present invention is not limited to the exact construction or methodology which has been previously delineated, but that various changes and modifications may be made without departing from the spirit and the scope of the invention as delineated in the following claims. Moreover, it should be appreciated that the weight and/or structural dimension of each of the top rail members 100 may be modified, as desired, to allow a designer to "program" or select a desired type of load distribution in order to optimize durability, improve damageability, and reduce noise, vibration, and harshness.

What is claimed is:

1. A vehicle bed assembly for a motor vehicle comprising:
   a front panel;
   a first side panel;
   a second side panel;
   a floor panel which is coupled to said first and to said second side panels and which is further coupled to said front panel;
   a first rail disposed horizontally along a top surface of the first side panel such that the first rail receives and is linearly coextensive with said first side panel, said first rail coupling said first side panel to said front panel; and
   a second rail that is substantially identical to said first rail and is disposed horizontally along a top surface of the second side panel such that second rail receives and is linearly coextensive with said second side panel, said second rail coupling said second side panel to said front panel.

2. The vehicle bed assembly of claim 1 further comprising an end cap member which is disposed within said first rail and which selectively couples said first side panel to said front panel.

3. The vehicle bed assembly of claim 2 wherein each of said first and second rails respectively includes a generally flat top portion and two generally opposed side surfaces and wherein said end cap member is coupled to said generally flat top portion and to only one of said two generally opposed side surfaces of said first rail.

4. The vehicle bed assembly of claim 3 wherein said end cap member includes a protruding threaded member.

5. The vehicle bed assembly of claim 2 further comprising a first reception member which is coupled to said first side panel and a second reception member which is coupled to said second side panel and which is substantially identical to said first reception member.

6. The vehicle bed assembly of claim 5 wherein said first reception member comprises a first portion which forms a member reception pocket having an axis of symmetry which is parallel to a plane containing said first side panel; and a second stem portion which forms an acute angle with said axis of symmetry.

7. The vehicle bed assembly of claim 6 wherein each of said first and said second side panels are corrugated.

8. A vehicle bed assembly comprising:
   a first bracket having a first wall and a second wall which cooperatively form a mounting portion, said first bracket further having a third wall which orthogonally projects from said first wall in a direction opposite to said second wall and which is selectively coupled to a vehicular frame member;
   a floor bed panel which is disposed upon and is coupled to said second wall of said first bracket;
   a front panel member which receives a portion of said floor bed panel and which is coupled to said first wall of said first bracket;
   a second bracket which receives said front panel member;
   a first side panel which is coupled to said floor bed panel;
   a second side panel which is coupled to said floor bed panel;
   a first rail which receives said first side panel;
   a second rail which receives said second side panel;
   a first end cap member which is disposed within said first rail and which selectively couples said first rail to said second bracket; and
   a second end cap which is substantially identical to said first end cap, which is disposed within said second rail, and which selectively couples said second rail to said second bracket.

9. The vehicle bed assembly of claim 8 wherein said first side panel includes a cutout portion and wherein said vehicle bed assembly further comprises a first and a second member, wherein said second member is attached to a first surface of said first side panel and overlays said cutout portion and wherein said first member is selectively attached to said second member and cooperates with said second member to form a stake reception pocket.

10. The vehicle bed assembly of claim 9 further comprising a first reception member which is coupled to said first side panel and a second reception member which is coupled to said second side panel and which is substantially identical to and aligned with said first reception member.

11. The vehicle bed assembly of claim 10 wherein said first reception member comprises a first portion which forms a member reception pocket having an axis of symmetry which is parallel to a plane containing said first side panel and a second stem portion which forms an acute angle with respect to said axis of symmetry.

12. The vehicle bed assembly of claim 11 wherein each of said first and said second side panels is corrugated.

13. A method for constructing a vehicle bed assembly, said method comprising the steps of:
   providing a floor pan;
   providing a front panel;
   providing a first side panel;
   providing a second side panel;
   providing a tail gate;
   coupling said front panel to said floor pan;
   coupling said first side panel to said floor pan;
   coupling said second side panel to said floor pan;
   coupling said tail gate to said floor pan;
   providing a direct load path from any location on said first side panel to a frame portion of a vehicle; and
   providing a direct load path from any location on said second side panel to said frame portion of said vehicle, thereby forming said vehicle bed assembly;
   wherein said step of providing a direct load path from any location on said first side panel to a frame portion of said vehicle comprises the steps of providing a first rail; coupling said first rail to said first side panel; providing a bracket; coupling said bracket to said front panel; coupling said first rail to said bracket; and coupling said bracket to said frame portion of said vehicle.

14. The method of claim 13 wherein said step of providing a direct load path from any location on said second side panel to said frame portion or said vehicle comprises the steps of:
   providing a second rail which is substantially identical to said first rail;
   coupling said second rail to said second side panel; and
   coupling said second rail to said bracket.

15. The method of claim 14 further comprising the steps of:

forming a first and a second reception member;

coupling said first reception member to said first side panel; and coupling said second reception member to said second side panel, thereby allowing said second reception member to cooperate with said first reception member to form a member reception assembly.

16. The method of claim 15 wherein said first reception member comprises a first portion which forms a member reception pocket having an axis of symmetry which is parallel to a plane containing said first side panel and a second stem portion which forms an acute angle with respect to said axis of try.

17. The method of claim 16 further comprising the steps of:

providing a Z-shaped bracket;

coupling said Z-shaped bracket to said frame portion of said vehicle; and coupling said Z-shaped bracket to said front panel.

18. The method of claim 17 further comprising the steps of:

forming at least a first stake pocket in said first rail; and forming at least a second stake pocket in said second rail.

* * * * *